United States Patent
Kling, III et al.

(10) Patent No.: US 7,855,783 B2
(45) Date of Patent: Dec. 21, 2010

(54) INTEGRATED CIRCUIT IMAGE SENSOR FOR WHEEL ALIGNMENT SYSTEMS

(75) Inventors: Michael J. Kling, III, Little Rock, AR (US); Steven W. Rogers, Conway, AR (US); Eric F. Bryan, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 338 days.

(21) Appl. No.: 11/898,956

(22) Filed: Sep. 18, 2007

(65) Prior Publication Data

US 2009/0073425 A1    Mar. 19, 2009

(51) Int. Cl.
*G01B 11/275* (2006.01)
(52) U.S. Cl. ................................. 356/139.09
(58) Field of Classification Search ............ 356/139.09, 356/155
See application file for complete search history.

(56) References Cited

U.S. PATENT DOCUMENTS

| | | | |
|---|---|---|---|
| 4,262,220 A | 4/1981 | Delacruz | |
| 5,018,853 A | 5/1991 | Hechel et al. | |
| 5,024,001 A | 6/1991 | Borner et al. | |
| 5,535,522 A | 7/1996 | Jackson | |
| 5,675,515 A | 10/1997 | January | |
| 5,724,128 A | 3/1998 | January | |
| 5,724,743 A | 3/1998 | Jackson | |
| 5,809,658 A | 9/1998 | Jackson et al. | |
| 5,818,574 A * | 10/1998 | Jones et al. | ............ 356/139.09 |
| 5,870,315 A | 2/1999 | January | |
| 5,943,783 A | 8/1999 | Jackson | |
| 5,949,901 A | 9/1999 | Nichani et al. | |
| 5,969,246 A | 10/1999 | Jackson et al. | |
| 6,041,148 A | 3/2000 | Wilt | |
| 6,064,750 A | 5/2000 | January et al. | |
| 6,134,792 A | 10/2000 | January | |
| 6,148,528 A | 11/2000 | Jackson | |
| 6,237,234 B1 | 5/2001 | Jackson et al. | |
| 6,252,973 B1 | 6/2001 | January et al. | |
| 6,269,194 B1 | 7/2001 | Nichani | |
| 6,298,284 B1 | 10/2001 | Burns et al. | |
| 6,323,776 B1 | 11/2001 | Jackson et al. | |
| 6,509,962 B1 | 1/2003 | Burns | |
| 6,657,711 B1 * | 12/2003 | Kitagawa et al. | ............ 356/155 |

(Continued)

OTHER PUBLICATIONS

Kodak Image Sensor Solutions datasheet: "Kodak KAC-9638 CMOS Image Sensor 1288 (H) x 1032 (V) SXGA 18FPS Monochrome CIS" Revision 1.9, Sep. 2004, 41 pages.

*Primary Examiner*—Isam Alsomiri
(74) *Attorney, Agent, or Firm*—McDermott Will & Emery LLP

(57) ABSTRACT

An integrated circuit (IC), for use in an imaging module of a wheel alignment system, incorporates an image sensor as well as a number of other features. Some of the added features are implemented within the integrated circuit. The IC also incorporates interfacing for signaling or communication with other devices in the imaging module or elsewhere in the wheel alignment system. Some examples of added internal features include a temperature sensor, unique chip ID, and chip power control. The addition of analog and/or digital I/O to the integrated circuit enables control of an image module illumination function, control of an imaging module positioning function, various cooling functions, and operator interface control. A communications hub may be added to the IC, to enable operation in a networked system environment.

20 Claims, 6 Drawing Sheets

U.S. PATENT DOCUMENTS

| | | |
|---|---|---|
| 6,744,497 B2 | 6/2004 | Burns |
| 7,295,297 B2 | 11/2007 | Burns et al. |
| 7,538,864 B2 * | 5/2009 | Golab et al. ........... 356/139.09 |
| 2002/0001076 A1 | 1/2002 | Jackson et al. |
| 2002/0020071 A1 | 2/2002 | Jackson et al. |
| 2002/0023361 A1 | 2/2002 | Jackson et al. |
| 2002/0027651 A1 | 3/2002 | Jackson et al. |
| 2002/0092183 A1 | 7/2002 | Jackson |
| 2002/0099483 A1 | 7/2002 | Jackson et al. |
| 2004/0128844 A1 | 7/2004 | Robb et al. |
| 2004/0246470 A1 | 12/2004 | Burns |
| 2008/0007722 A1 * | 1/2008 | Golab et al. ........... 356/139.09 |
| 2008/0016707 A1 * | 1/2008 | Rogers .................... 33/203.18 |

* cited by examiner

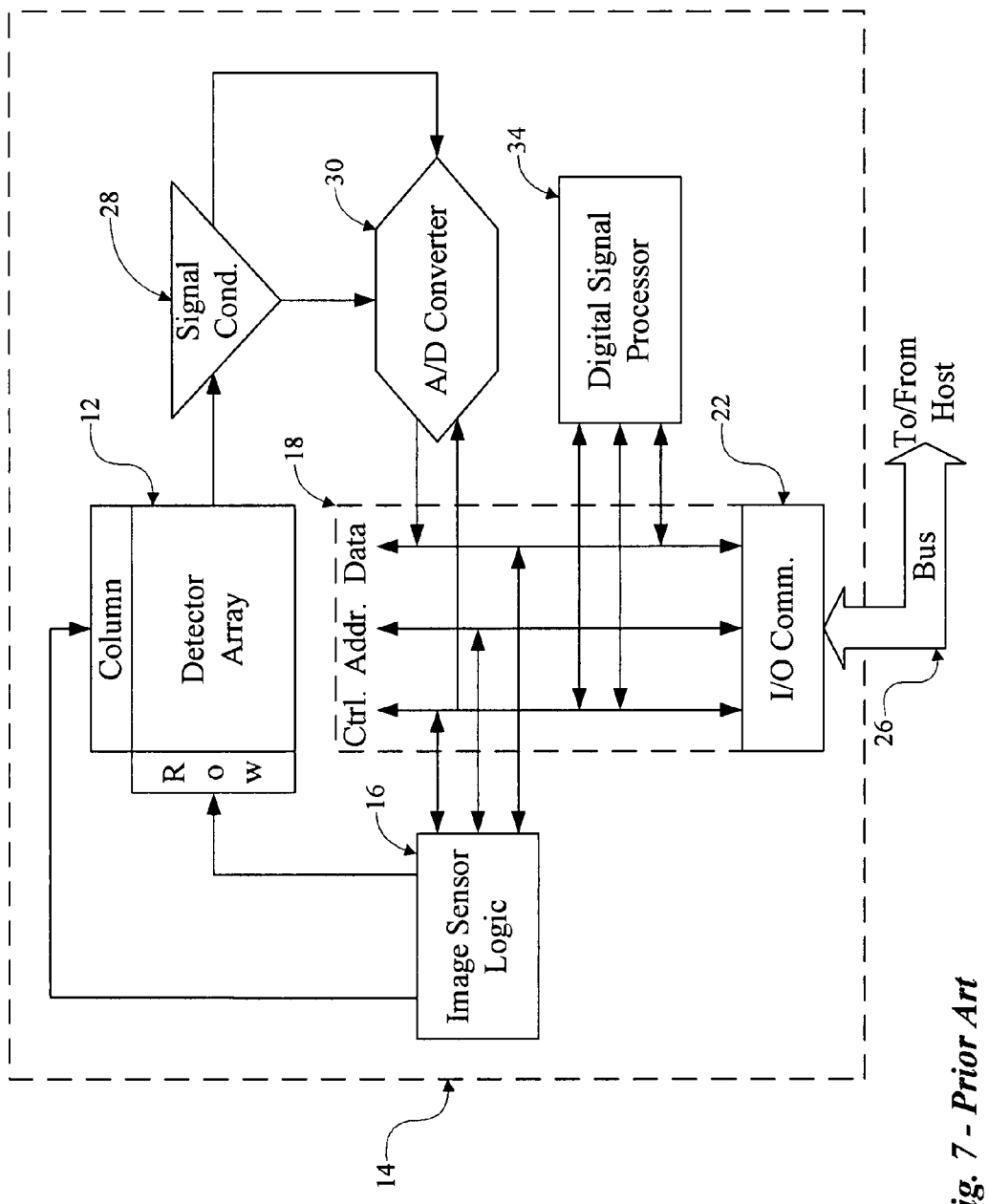
Fig. 7 - Prior Art

INTEGRATED CIRCUIT IMAGE SENSOR FOR WHEEL ALIGNMENT SYSTEMS

TECHNICAL FIELD

The present teachings relate to integrated circuits for use in image-based wheel alignment systems, where one such integrated circuit includes an image sensor as well as other system components for processing and/or control; and the present teachings encompass imaging modules and alignment systems incorporating such integrated circuits.

BACKGROUND

In recent years, wheels of motor vehicles have been aligned using a computer-aided, three-dimensional (3D) machine vision alignment system. In such a system, one or more cameras view targets attached to the wheels of the vehicle, and a computer in the alignment system analyzes the images of the targets to determine wheel position and to determine alignment of the vehicle wheels from the wheel position data. The computer typically guides an operator in properly adjusting the wheels to accomplish precise alignment, based on calculations obtained from processing of the image data. A wheel alignment system or aligner of this type is sometimes called a "3D aligner." An example of a vehicle wheel aligner using such image processing is the Visualiner 3D, commercially available from John Bean Company, Conway, Ark., a unit of Snap-on Tools Company.

Alignment systems of the type outlined above utilize at least one "image sensor," which is a light sensitive sensor capable of sensing a two-dimensional array image. An image sensor typically is a component of an imaging module, which communicates with the host computer. In addition to the sensor array, circuits in the module include timing and control circuitry for the sensor and possibly analog processing circuitry, e.g. amplification, filtering and/or gain control circuitry. The module circuitry usually includes an analog to digital (A/D) converter, to convert the sensor pixel measurement signals to digital data values, and data communication circuitry for communications with the external host computer. The module may also contain a processor and memory to provide additional control and pre-processing of the sensor array data. Attention is directed to US Patent Application Publication No. 2004/0128844 to Robb et al., assigned to the assignee of the present subject matter and incorporated herein by reference.

Often, the imaging module includes other system components. For example, the module may include a strobe or the like for target illumination as well as indicators or display devices to provide operator guidance. A positioning system, for controlling the position of the imaging module relative to the viewable target, may be contained within the imaging module or be external to the imaging module. Such a positioning system enables adjustment of the height and/or one or more angles or directions of orientation of the image sensor relative to the subject.

In early generation image based wheel alignment systems, the various elements of the imaging module were implemented with functionally discreet components on large and expensive circuit boards. As more powerful integrated circuits were developed some of these functions have been combined on a single chip. FIG. 7 is a block diagram illustrating the elements on the integrated circuit of the prior art incorporating an image sensor, sensor control logic and some associated signal processing circuitry.

As shown, the integrated circuit 14 includes an image sensor, in the form of a complementary metal oxide semiconductor (CMOS) detector array 12. The integrated circuit 14 also includes image sensor logic 16 serving as the sensor controller. The image sensor logic 16 communicates with the detector array 12 to control the output from pixels of the array 12 and to thereby control the operation of the array. The controller 16 also directs communications via the input/output 22 for the integrated circuit 14, including communication of signals for control, data and addresses, as the circuit 14 communicates with an external host computer system across an interface bus 26. The prior integrated circuit 14 also includes analog to digital (A/D) converter 30 and signal conditioning circuitry 28.

Additionally, a processor 34 on the integrated circuit 14 can be programmed, so that the integrated circuit 14 becomes an application specific integrated circuit (ASIC). An internal bus 18 on the integrated circuit 14 provides control, address and data signaling between the elements of the integrated circuit. Depending on the ASIC, the processor 34 can include a digital signal processor, a micro-processor, and/or a microcontroller processor. The processor 34 on the integrated circuit 14 may be implemented to perform the desired alignment computations previously executed in the host computer. Hence, one such ASIC design can calculate orientation and position, for a machine vision alignment system, whereas another ASIC design might calculate angles and positions in a wheel-mounted alignment system.

Many of the other wheel alignment system functions, however, including other functions typically performed in the imaging module, are still implemented independently and are not integrated into the circuit with the image sensor. Hence, there is still room for further improvement.

SUMMARY

Integrated circuits (ICs) are disclosed herein for use in a wheel alignment system. Such an integrated circuit or "chip," includes an image sensor, a programmable controller and multiple interfaces. The image sensor is coupled to the controller, for example, to allow control of operations of the image sensor when imaging a field of view encompassing a target subject of a wheel alignment measurement by the system. One interface, for data communication, provides the capability to transmit information based on representative image data, from the image sensor to a host computer of the wheel alignment system. Another integrated interface comprises an input/output interface for control signaling with at least one other element of the system. The control signaling interface enables the controller to control an operation of the other element.

The integrated input/output interface may be a digital input/output interface or an analog interface, and an example of the IC disclosed below includes both types of interfaces on the one chip. The interface(s) enable the controller to signal one or more other elements of the system, e.g. to receive sensory inputs and/or to send control signals. The interface capabilities allow an exemplary control of one or more operations of the wheel alignment system, such as: brightness control of a strobe for illumination of a target of the system; cooling of the integrated circuit; and activation of one or more user perceptible indicators, for indicating one or more conditions regarding operations of the wheel alignment system. Another control function through the interface(s) might enable the controller to control movement of at least one system element effecting optical input to the image sensor, such as up/down motion of the imaging module, angular movement (up-down or left-right) of the module or the IC based camera within the module to adjust the direction of the camera, iris or aperture adjustment, or focal adjustment. In the disclosed examples, the interfaces also allow the controller to receive a signal representing a system condition, such as sensed motor current, sensed motor speed and/or sensed position of an imaging module containing the integrated circuit.

A variety of other elements, useful in the context of a wheel alignment system, also may be integrated on the common chip. For example, the chip may include an analog to digital converter coupled to the image sensor, for converting analog image signals from the image sensor into digital image data. As another example, the IC chip may include a sensor for sensing a temperature of the integrated circuit. In that case, the input/output interface provides signaling from the controller to a cooling device of the system, to enable the controller to control the cooling device based on the sensed temperature of the integrated circuit.

In the example, the integrated circuit further includes non-volatile memory for storing calibration data for correcting non-linearity in the imaging sensor and/or individual pixel gain correction factors for correcting measurement accuracy. The integrated circuit may include memory or the like for providing a unique chip identification that provides identification for a specific camera module containing the integrated circuit. Also, the integrated circuit might further include a communication hub.

The exemplary on-chip controller is a processor programmed for pre-processing the representative digital image data, to produce the information for communication to the host. Examples of such pre-processing, that the processor can perform on the digital image data include: calculating gradient information from the digital image data; extracting data for a region of interest from the digital image data; performing a background subtraction on the digital image data; compressing the digital image data; recognizing an image feature from the digital image data; analyzing an image feature from the digital image data; calculating a target plane from the digital image data; calculating vehicle wheel orientation from the digital image data; calculating wheel alignment angle from the digital image data; and comparing a wheel alignment angle calculated from the digital image data to a vehicle wheel alignment specification.

The teachings herein also provide an improvement in a wheel alignment system. The wheel alignment system has an imaging module and a host computer for calculating a vehicle wheel alignment parameter responsive to the imaging module for output to a user. The improvement is an integrated circuit in the imaging module, wherein the circuit includes an image sensor, a programmable controller a data communication interface and an input/output interface, all integrated on one chip.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a functional block diagram of a prior integrated circuit, containing an image sensor and other circuitry, for use in a wheel alignment system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various teachings disclosed herein relate to incorporating additional imaging module or system features into the integrated circuit that contains the image sensor, for applications in wheel alignment systems. Some of the exemplary features are fully contained within the integrated circuit while others relate to interfacing the integrated circuit with other devices in the imaging module or elsewhere in the wheel alignment system. Some examples of added internal features include a temperature sensor, a unique chip ID, and a chip power control. The addition of analog and/or digital I/O to the integrated circuit may enable control of the imaging module illumination function, control of the imaging module positioning function, aperture control, focal control, control of various cooling functions, operator interface control, etc. As another example, a communications hub can be added to the integrated circuit, to enable it to operate in a networked system environment.

Figure 1:
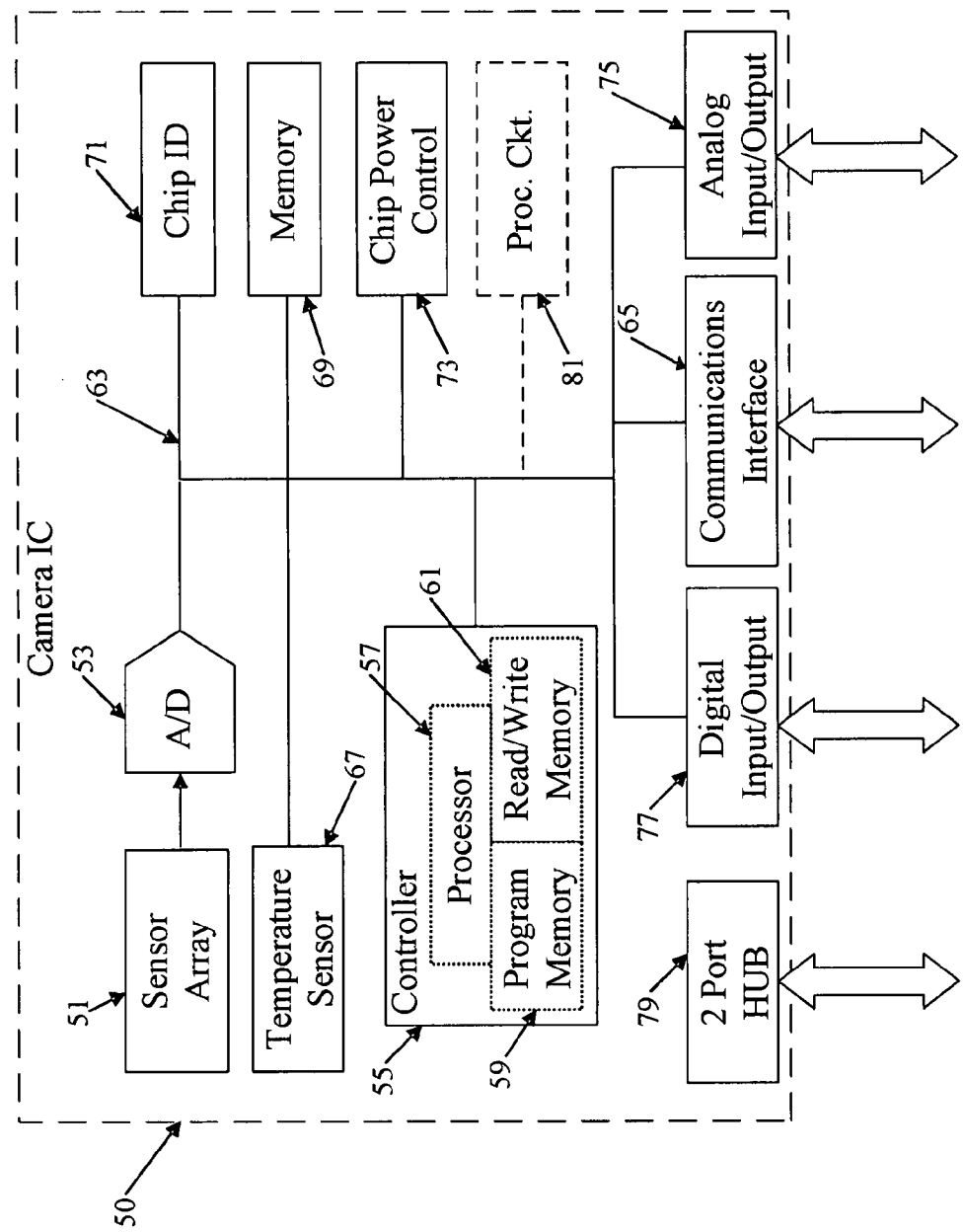
FIG. 1 is a block diagram of an integrated circuit, containing an image sensor and other elements, as may be used in an imaging module of a wheel alignment system.

Reference now is made in detail to the examples illustrated in the accompanying drawings and discussed below. FIG. 1 illustrates a functional block diagram of an integrated circuit 50. In order for an imaging module to perform all of the functions generally required in a wheel alignment application, several items are required in addition to the image sensor array. Some of these additional functions may include: timing and control of target illumination, control of sensor positioning to maintain the optimal image of the targets as the vehicle being aligned is moved up and down on the alignment lift, control of various indicators used to assist the vehicle technician in performing the wheel alignment process, and control of cooling devices used to keep the imaging module within a desired temperature range. The circuit 50 integrates significant portions of these module functions together with the image sensor and may add some other new features to enable low powered networked measurement.

Hence, integrated circuit 50 incorporates the sensor array 51, an A/D converter 53, and a controller 55. The sensor array may be a CCD or CMOS device, or other solid state device for obtaining image information that can be implemented on a semiconductor chip. The housing may incorporate an electronic shutter or iris and/or an electronic element for optically focusing images with respect to the sensor array 51.

The sensor array 51 typically produces analog image signals. Analog processing circuitry (not separately shown) may provide amplification and/or filtering. In operation, the camera formed by the sensor array 51 and the A/D converter 53 outputs a digital value of each image pixel based on analog intensity of the sensed light at the point in the image corresponding to the pixel. The value is digitized and read out. To get higher output values, the camera gain is increased, to effectively multiply the output of the sensor. Alternatively, the aperture (diameter of a lens iris not shown) may be opened or the sensor light collecting time is lengthened, to increase sensitivity and thereby obtain higher-value output data.

The controller 55 typically includes a programmable processor 57 and possibly a digital signal processor. The controller 55 also incorporates program memory 59 and read/write memory 61, for storage of various data. The processor 57 executes a program from memory 59 to control sensor operation and a variety of other system features. The programming may also cause the processor to pre-process the image data, before communication to the host. An internal bus 63 provides communications between the various elements on the integrated circuit 50, including the A/D converter 53 supplying the digitized data output from the image sensor 51 and the elements of the controller 55.

A communications interface 65 provides communications to and from a host computer, as will be discussed later. The host communications interface 65 conforms to an appropriate data protocol standard and provides a coupling to a desired physical media, to enable data communication to and from the host computer at desired speeds and in a manner desired for the particular installation. In a typical shop installation for wheel alignment, the host communications interface 65 is a USB interface, and the imaging module includes an appropriate a USB connector for cable connection to a matching interface in the host computer. Those skilled in the art will recognize that other data communications interfaces may be used in wheel alignment systems. For example, if it is desirable in a particular application for the user to have a portable terminal, the host may be a laptop or handheld device, in which case it may be advantageous to use an interface 65 facilitating wireless communications with the host.

The controller 55 is responsive to commands or the like received from the host via the communication interface 65, to provide control signals to the various elements in the IC 50 and in the imaging module (discussed later relative to FIGS. 4 and 5) and/or to control some other elements of the system outside the imaging modules. For example, the controller 55 activates the sensor array 51 in response to control data from the host computer system, received via the host communication interface 65, so as to form images and provide image data at times specified by the host computer system. The controller 55 also controls the illumination. Currently illumination is controlled by varying duration, however, the controller might also control output intensity. In response to instructions from the host computer, the controller 55 might also provide control signals to the sensor array to set the exposure duration of each image sensing (effective "shutter speed") for each image captured, or to set a gain for the signal processing, so as to increase or decrease the sensitivity and thus the average pixel intensity level of the data output by the camera IC 50.

The integrated circuit 50 incorporates a number additional imaging module features. In the example, the circuit 50 includes a temperature sensor 67 integrated on the chip, to monitor temperature within the imaging module such as the temperature of the sensor array 51. This information can be useful for compensation of the output of the sensor array for temperature variations and/or for control of various cooling elements.

In the example, a memory 69 provides additional non-volatile storage, e.g. for camera calibration data. This data is used by the on chip controller 55 to correct for non-linearity in the imaging sensor array 51. The memory 69 can also store individual pixel gain correction factors to increase measurement accuracy. The memory 69 could also be used to store camera identification information, although in the example, the integrated circuit 50 includes a chip-ID 71 feature integrated into the image sensor chip.

The integrated circuit 50 may incorporate a power control 73. For convenience of illustration, connections to the power supply and ground are omitted. The chip power control 73 function can power down chip elements that are not being actively used at a given time to minimize power usage and thereby chip temperature. Such control may be responsive to the sensed temperature, as detected by sensor 67.

The exemplary circuit 50 also integrates several additional communications/control elements onto the chip. The analog Input/Output circuit 75 provides a way for the integrated circuit to interface with various system functions that utilize analog signals, but cannot be integrated onto the integrated circuit 50. Some of the signals that may be used, depending on the alignment system configuration, include camera positioning motor current and speed inputs, module position input, and motor speed and current limit outputs. The digital Input/Output 77 provides a way for the integrated circuit to interface with system functions that utilize digital signals, but cannot be integrated onto the integrated circuit 50. Some of the digital signals that may be used depending on the alignment system configuration include:

Commanding the illumination driver circuit to turn the illumination on or off;
  Commanding the camera positioning driver to move the camera up or down;
  Controlling the speed of the positioning driver with a PWM (pulse width modulation) output signal;
  Detecting the actuation of the camera position system upper limit switch;
  Detecting the actuation of the camera position system lower limit switch;
  Commanding a cooling fan to turn on or off;
  Commanding an active cooling circuit to turn on or off;
  Commanding the roll back positioning indicator to turn on or off;
  Commanding the roll forward positioning indicator to turn on or off;
  Commanding the turn front wheels left indicator to turn on or off;
  Commanding the turn front wheels right indicator to turn on or off; and
  Commanding the target-acquired indicators to turn on or off (or change color).

In an implementation discussed more below, the imaging modules utilize USB type communications with the host computer system. To facilitate further networking, the integrated circuit 50 may further incorporate a two port hub 79, which enables daisy chaining of imaging modules in a network configuration. Those skilled in the art will recognize, however, that other communications technologies may be used to implement the hub 79.

The integrated circuit 50 may incorporate other elements, to facilitate desired implementations of wheel alignment system operations. For example, the integrated circuit chip 50 might include additional processing circuitry 81. The additional incorporated circuitry 81, for example, could take the form of a digital signal processor or a field programmable gate array (FPGA), for off-loading some desired processing from the processor 57.

The processing elements incorporated onto the chip 50 may implement a wide range of processing functions useful in operations of a wheel alignment system. Examples of such on-board processor functions include:

Reading data from the sensor array;

Determining a region of interest (ROI) and retrieving sensor data only from that area of the sensor array;

Controlling the timing of the target illumination and sensor readings;

Controlling intensity, color or the like of the light output of the illumination devices;

Adjusting the output values of the individual pixels from the image sensor based on stored pixel gain normalization data stored in the nonvolatile memory on the integrated circuit;

Linearizing the sensor array output data based on calibration data stored in the nonvolatile memory on the integrated circuit;

Performing a background subtraction;

Performing a gradient calculation on the sensor data;

Calculating location and orientation of any or all of the targets within the image sensor field of view;

Compressing the sensor data for transmission to a host computer;

Controlling an imaging module positioning system to move the imaging modules or sensors within the modules, e.g. so that the targets are within the desired sensor field of view area;

Controlling the various indicators used to assist the equipment operator measure the wheel alignment of a vehicle;

Controlling bi-directional communications with a host processor;

Communicating with other imaging modules in a networked environment to provide or obtain measurement data (One of the imaging modules is capable of being the master device that collects data from the others and calculates the vehicle wheel alignment parameters. The master device can also communicate via the network with an external computer that can take several forms. It can be a user interface module that the operator uses to operate the alignment system and receive wheel alignment procedure guidance and data. Alternatively the external computer can be a host processor such as a PC in a wheel aligner console. Wheel alignment system functionality can be split at various levels between the improved integrated circuit image sensor module and the external computer based on the desired system configuration.);

Reading the sensor temperature and controlling one or more cooling devices in the module, such as a fan or a thermoelectric cooling device; and Reading values of dark pixels and controlling external cooling devices such as a fan or a thermoelectric cooling device to minimize signal noise.

For more information regarding several of these processing features, such as gradient calculation, background subtraction, data compression, and temperature sensing and attendant cooling control, attention is directed to the aforementioned US Patent Application Publication No. 2004/0128844 to Robb et al.

Figure 2:
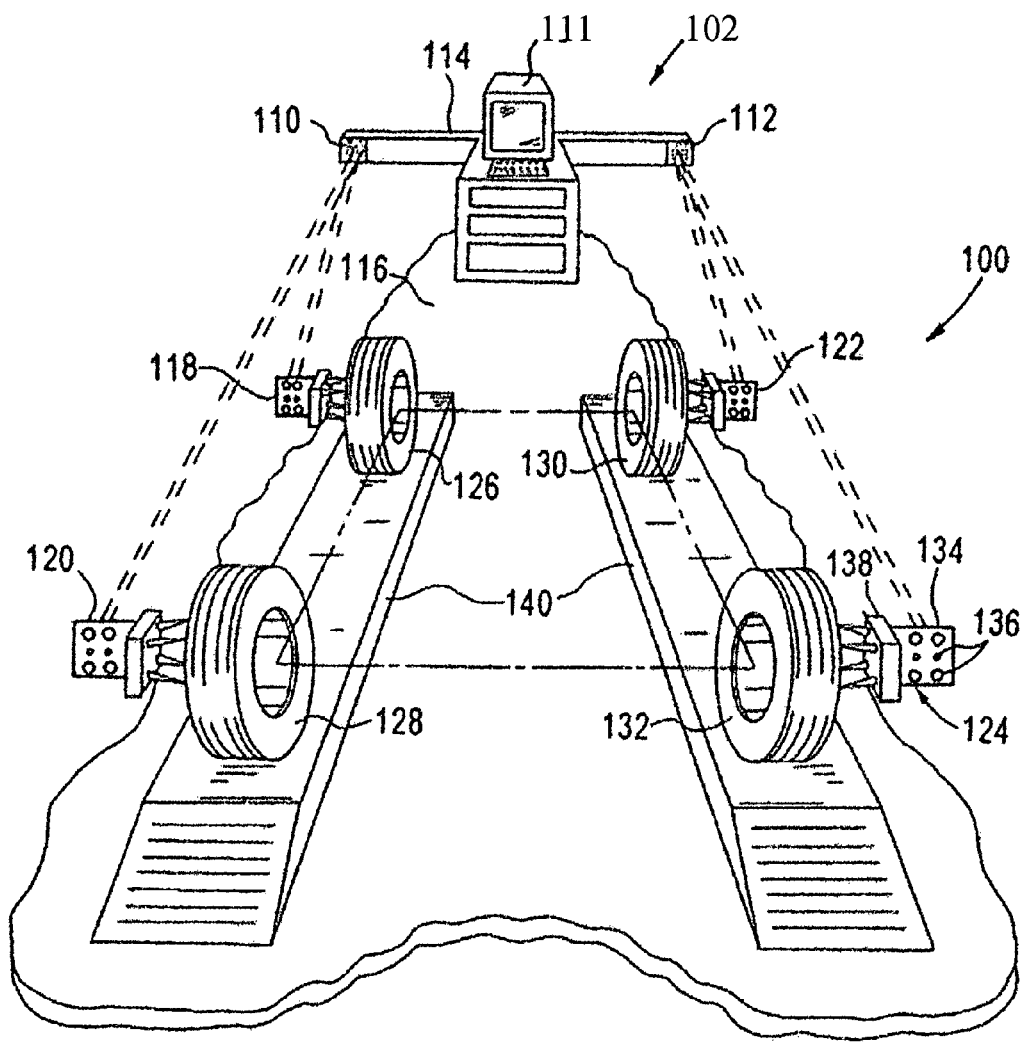
FIG. 2 a perspective view of a wheel alignment system and wheels (only) of a vehicle during alignment measurement by the system.

The integrated circuit concepts discussed herein are applicable to improve systems for measuring one or more wheel alignment parameters based on image processing. As shown by FIG. 1, an increasing variety of functions of the system appear on the integrated circuit 50. To fully appreciate the functions of the elements on the chip 50, it may be helpful to consider the alignment measuring system, as a whole. In this regard, it may be helpful to first consider a specific example of an image-processing type wheel alignment measuring system, such as a 3D aligner as illustrated in FIG. 2, before going into the details of the imaging module that incorporates the IC 50.

In the example shown, the aligner system 100 consists of three major components. The first of these elements is an illumination and imaging system 102. This portion 102 of the system 100 comprises two imaging modules 110, 112. Each of the imaging modules 110, 112 includes a light emitter or illumination system (typically a strobe). Each of the imaging modules 110, 112 also includes an image sensor, typically in the form of a digital camera. Here, the digital camera is implemented by the sensor array 51 and the A/D converter 53 of the IC 50. Essentially, each camera forms an image of objects within its field of view, which in operation includes one or more targets; and in response to the image each camera generates digital image data. As discussed more, later, each of the imaging modules 110, 112 may include circuitry for processing of the digital image data, e.g. to perform background subtraction, region of interest extraction, gradient calculations and/or compression of the image data.

Each light emitter takes the form of an array of strobed (flashing) red or infrared LED's mounted around the aperture of one of the cameras. The exemplary system uses high-resolution digital cameras. The imaging modules 110 and 112 are mounted at opposite ends of a horizontal beam 114. In the wheel alignment application, the beam 114 provides desired separation between the modules, to allow the desired view of the vehicle wheels from opposite sides. The height of the beam 114, and thus the height of the cameras in the modules 110 and 112, may be fixed or adjustable. In an example discussed more later, the height of the beam 114 is motor controlled in response to control signals from one of the modules, to facilitate camera position control as well as target acquisition. The structure of the beam 114 and the structure for supporting the beam 114 are not significant for purposes of this discussion. Those skilled in the art will recognize that a wheel alignment system may use a single imaging module or use more than the two modules 110, 112 shown in the example.

The second major element of the aligner 3D system is one or more optical targets in some way associated with a wheel of the vehicle. The wheel itself might serve as a target. One or more of the targets could be handheld, for manual placement against a wheel or against another point of a vehicle useful in measuring a parameter (e.g. ride height) that is determined in a wheel alignment procedure.

The illustrated example includes a set of four passive heads, 118, 120, 122 and 124 for attachment to the vehicle wheels 126, 128 130 and 132. Each head includes a wheel-rim clamp and an attached target object. In the example, each target object has a planar surface with a plurality of visually perceptible, geometrically configured, retro-reflective target elements, which appear as a pattern of reflective circles or dots of different sizes on the planar surface. Examples of target bodies 134 and target elements 136 acceptable for use in wheel alignment applications are described in U.S. Pat. No. 5,724,743. Other target designs may be used for wheel alignment, for example with different visually perceptible target elements 136.

In the wheel alignment application, targets 118, 120, 122, 124 are mounted on each of the wheels 126, 128, 130, 132 of the motor vehicle. Each target 118, 120, 120, 124 includes a target body 134, target elements 136, and an attachment apparatus 138. The target elements 136 are positioned on the target body 134. The attachment apparatus 138 attaches the target 118, 120, 120, 124 to a vehicle wheel 126, 128, 130, 132, respectively. An example of an attachment apparatus is described in U.S. Pat. No. 5,024,001, entitled "Wheel Alignment Rim Clamp Claw" issued to Borner et al. on Jun. 18, 1991. Of course other mounting arrangements may be used.

The beam 114 supporting the imaging modules 110 and 112 has a length sufficient to position the cameras in the modules 110, 112 respectively outboard of the sides of the vehicle to be imaged by the aligner system 100. Also, the beam 114 positions the cameras in the modules 110, 112 high enough above the wheels to ensure that the two targets 118, 120 on the left side of the vehicle are both within the field of view of the left side camera in module 110, and the two targets 122, 124 on the right side of the vehicle are both within the field of view of the right side camera in module 112.

The other major element of the aligner system 100 is a programmed computer or host 111, typically a personal computer or similar programmable data processing device. In a typical implementation, the computer 111 includes a processor, a keyboard, a mouse, a printer and a color display monitor, as will be discussed in more detail, later with regard to FIG. 6. For wheel alignment, the computer 111 may be programmed to receive and process the image data from the imaging modules 110 and 112. For example, if the imaging modules pre-process the image data, the host computer 111 processes the received data to calculate alignment parameters for a vehicle and to provide a graphical three-dimensional representation of those parameters as a display to a mechanic. In general, the host processing system 111 processes the image information to derive positional data regarding position of the visually perceptible target elements from the camera images; and the host processing system 111 processes the positional data to determine one or more wheel alignment parameters of the vehicle under test. The computer also provides the user interface for operation of the system. If the controller in one of the modules computes the alignment parameters, the host computer provides the display to the mechanic. The computer 111 also offers a variety of other information useful in adjusting vehicle alignment.

In operation, once the wheel aligner system 100 has been calibrated in a known manner, a vehicle can be driven onto the rack 140, and, if desired, the vehicle lifted to an appropriate repair elevation. The targets 118, 120, 122, 124, once attached to the wheel rims, are then oriented so that the target elements 136 on the target body 134 face the camera in the respective module 110 or 112. The camera height may be fixed or adjustable to correspond to lift height. The vehicle and model year can then be entered into the computer 111 along with other identifying parameters, such as vehicle VIN number, license number, owner name, etc.

To take measurements, the mechanic begins by operating the system 100 to take a first set of images of the targets 118, 120, 122 and 124. The mechanic then rolls the vehicle back a slight distance, up to eight inches; and the system 100 takes another set of images of the targets 118, 120, 122 and 124. Finally, the mechanic rolls the vehicle forward to its initial position, and the system 100 takes more images. For example, from the position and orientation of the target in the images taken at the various positions, the IC 50 or the computer 111 calculates the actual position and orientation of each wheel axis, including certain alignment parameters such as toe, camber, thrust angle and setback.

The front wheels 126, 130 of the vehicle may rest on turntables (not shown), so that the mechanic can operate the steering wheel of the vehicle to change the positions of the front wheel during alignment operations. For example, the mechanic will operate the system 100 to take an image of the targets 118, 120, 122 and 124 with the wheels 126, 130 turned to one side. The mechanic then turns the wheels 126, 130 to the other side; and the system 100 takes another image of the targets 118, 120, 122 and 124. From the position and orientation of the front targets 118, 120 in these images taken at the two turned positions, the IC 50 or the computer 111 calculates the steering axis about which each front wheel 126 or 130 turns.

Once all measurements are complete, the computer 111 generates a visual output of the measured alignment parameters and/or provides data relating to adjustments needed to bring the alignment parameters back to original manufacturer's specifications. The computer 111 stores manufacturers' specified values and tolerances for the alignment parameters, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system 111 can provide visual displays and/or printouts, for purposes of billings, reports to the customer, etc.

Figure 3:
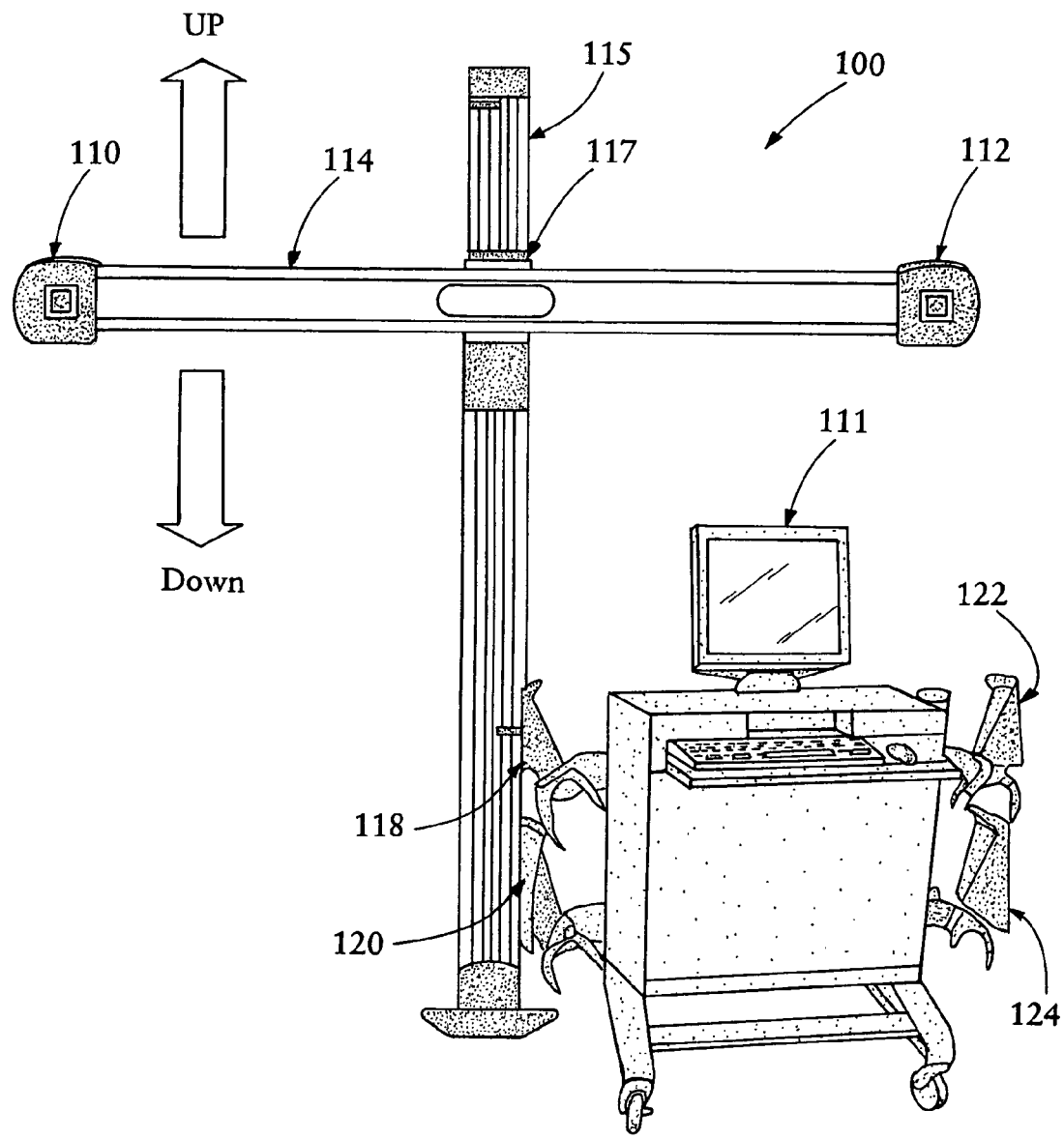
FIG. 3 is an isometric view showing more detail of the alignment system.

FIG. 3 depicts the elements of the aligner system 100 in somewhat more detail. As shown in that drawing, the aligner system includes the two imaging modules 110 and 112 mounted at opposite ends of the horizontal beam 114. In the example, the height of the beam 114, and thus the height of the cameras in the modules 110 and 112, is adjustable in opposite directions as represented by the UP and Down vertical arrows. Although other support arrangements may be used, the example includes a vertical beam 115. A motorized mounting system 117 attaches the beam horizontal 114 to the vertical beam 115 and provides vertical movement of the beam 114 in response to appropriate motor control signals.

In the example, the two modules 110, 112 vertically move in unison, as the beam 114 moves up and down. Those skilled in the art will recognize that other mounting arrangements may be used to provide similar or enhanced motion, e.g. to allow independent movement of the two modules and/or to allow additional degrees of freedom of movement of either one or both of the exemplary imaging modules.

Each of the imaging modules includes a light emitter or illumination system and an image sensor as well as several visible indicators, for providing information to operators of the system 100. For purposes of this discussion, the modules 110 and 112 specifically incorporate the integrated circuit 50 of FIG. 1, providing the image sensor, pre-processing of image data, sensor and control related signaling to other system elements, and communication to the host computer system 111. FIG. 3 also shows the target heads, 118, 120, 122 and 124 as they might be stowed, e.g. on the cart supporting the host computer 111 of the system 100.

Figure 4:
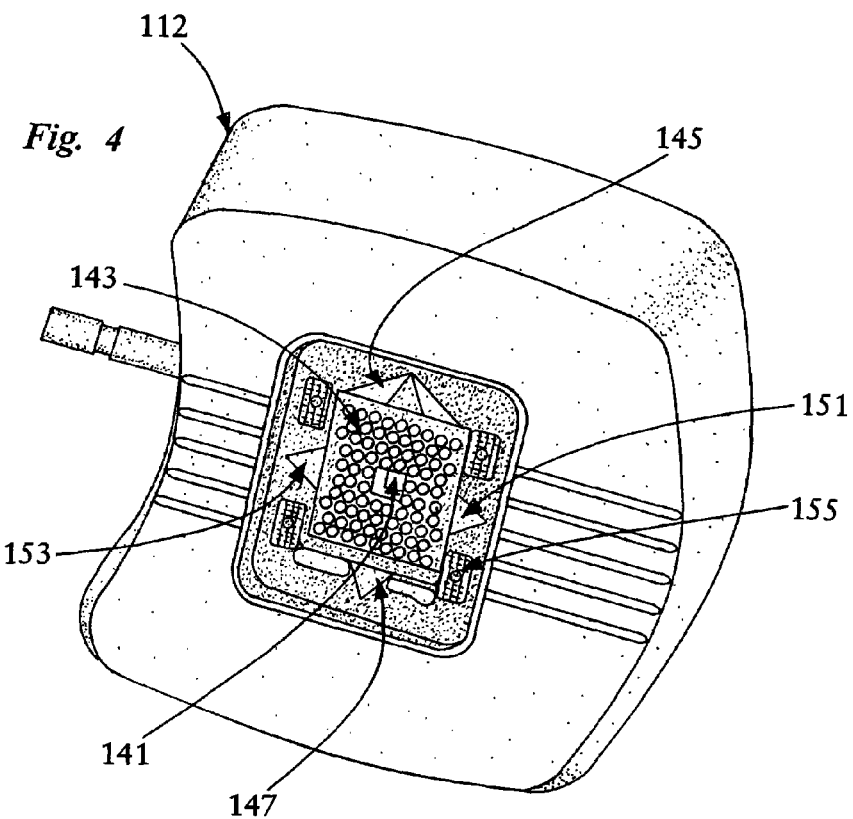
FIG. 4 is a close-up view of one of the imaging modules used in the system of FIGS. 2 and 3.

FIG. 4 depicts the face of the imaging module 112, that is to say, the side that should face toward the subject vehicle during imaging operations of the system 100. The module 110 is substantially the same as the module 112 except that the housing is the mirror image of that shown in FIG. 4, so as to facilitate mounting of the module 110 on the opposite end of the horizontal beam 114. As shown in FIG. 4, each imaging module includes an aperture 141, for allowing light to enter the module and impact on the sensor array inside the module. An adjustable iris and/or focal lens may be incorporated in the module at the aperture 141. The module 112 includes an LED array 143 forming the strobe, for illuminating the targets. The LEDs of the array 143 may emit visible, e.g. red light, or those LEDs may emit radiant energy in other portions of the spectrum, e.g. infrared or ultraviolet. Those skilled in the art will understand that other illumination elements may be used. Although not readily apparent from the black and white drawing, the module may also include an LED indicator light which the controller within the IC 50 activates to indicate to the technician when the camera is operating (particularly for an implementation where the array 143 produces light outside the visible portion of the spectrum).

In this implementation, the imaging module 112 also includes a number of visible indicators, which provide useful information to the operator during manipulation of the targets and the subject vehicle. Although the visible indicators may be used for other purposes, in the example, the indicators provide information to facilitate or confirm target acquisition by the image sensor in the respective module.

Directional LEDs 145, 147, 151 and 153 inform the technician as to whether the vehicle should move forward, backward, or be steered right or left in order to be viewed by the cameras formed by the sensor arrays in the imaging modules 111, 112. Traditionally, this indication was shown on the monitor of the host computer 111 of the wheel alignment system 100, therefore the technician was required to view the monitor in order to determine the direction in which the vehicle should move. Using the LEDs as directional indicators, the monitor need not be viewed. Operation of these indicators is controlled by the controller within the IC 50, under software control, although this operation of the IC controller may be responsive to instructions from the host computer system.

For example, the LED indicator light 145, appearing as a red triangle just above the top of the LED array 143, serves as a roll forward indicator. The modules illuminate this indicator to advise the operator to roll the vehicle forward, as part of an alignment measurement procedure. An LED indicator light 147, appearing as a red triangle just below the bottom of the LED array 143, serves as a roll back indicator. The modules illuminate this indicator to advise the operator to roll the vehicle backward, as part of an alignment measurement procedure. The indicators on the module also include two LEDs 151 and 153, on opposite sides of the LED array 143. The modules illuminate the right indicator 151, to instruct the operator to turn the vehicle wheels to the right; and the modules illuminate the left indicator 153, to instruct the operator to turn the vehicle wheels to the left.

In this way, the various indicators on the imaging module may be illuminated as necessary to instruct the operator to manipulate the vehicle and/or the targets so as to bring the wheel mounted targets properly into the field of view of the respective imaging module 110 or 112. In that regard, the processor 55 (or 81) on the chip 50 within the respective module may process image data from sensor 51 and A/D converter 53, to determine if expected target data is contained in the data from the image sensor. Based on analysis of the data, particularly where a portion but not all of a target is detected in an image, it is possible for the processor to determine how the vehicle or target should be manipulated to improve visibility thereof by the sensor, and the controller 55 on the chip activates the appropriate one or more of the indicators 145-153, to advise the operator.

The indicators on the module also include four (4) bi-color wheel indicator LED lights 155 approximately adjacent to the four corners of the LED array 143. Each of these bicolor wheel indicators is associated with a particular vehicle wheel. Each LED indicator informs the technician as to whether the target for the specific associated wheel has been successfully acquired by the system. Generally, a target for a specific wheel has been successfully acquired when alignment software loaded onto the computer has been able to process images from the camera and locate the target in space. Alternatively, this target acquisition detection may be implemented in software or firmware for the controller within the IC 50. Bi-color wheel indicators 153 provide a visual indicator to the technician that the alignment software has successfully acquired the target, i.e. processed an image from the camera and located the target in space.

For example, each of the bi-color wheel indicators 153 could emit light in the green range of the visible spectrum when the respective target has been successfully acquired, whereas each of the bi-color wheel indicators could emit light in the red range of the visible spectrum when the respective target has not been successfully acquired. Of course, it should be understood that these visible indicators can emit light in any range of the visible spectrum, and additional (multicolor) variations may indicate other target states.

Figure 5:
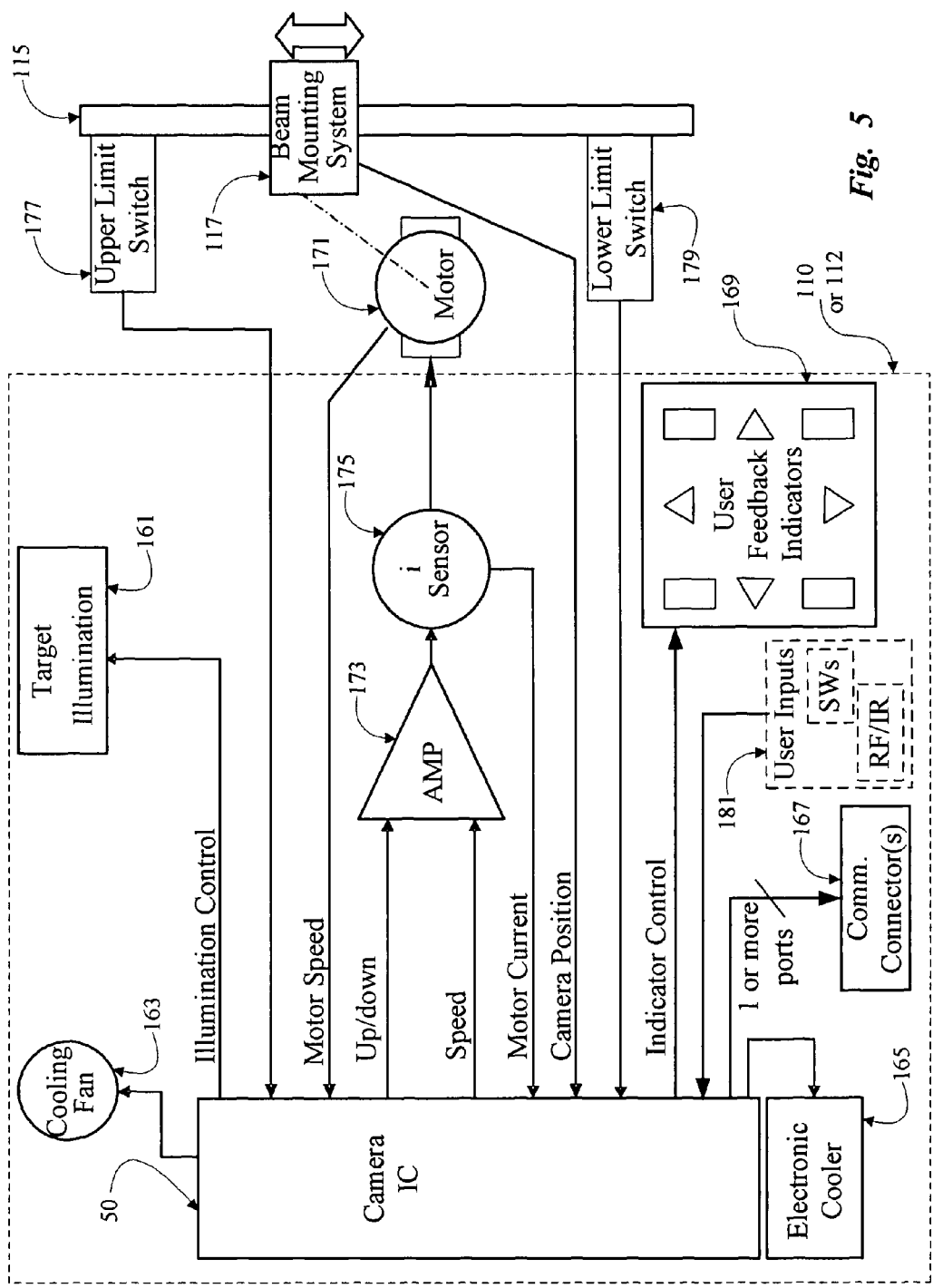
FIG. 5 is a functional block diagram of the elements in an imaging module.

The block diagram in FIG. 5 provides a high level illustration of the functional elements of an example of one of the imaging processing modules 110, 112, for use in the wheel alignment type system 100. The illustrated module 110 or 112 includes the integrated circuit (IC) 50, providing the image sensor, controller, and several other elements utilized in the imaging module. The elements of the module 110 or 112 may be built on a single circuit board, although in some implementations, the LED array is a separate replaceable component of the module. FIG. 5 also depicts interconnection of the module to certain elements for monitoring and controlling camera position.

The illustrated module 110 or 112 includes one or more elements 161 for illuminating the target(s) when mounted on the vehicle wheels. The IC 50 provides signals to control the brightness and timing of the illumination provided by the element(s) 161. In this regard, the IC may control the on-off state of the element 161 and/or the intensity of the output. Typically, the target illumination element 161 comprises an LED array 143 (as shown in FIG. 4) and associated driver circuitry, serving as a strobe, to emit radiant energy for desired illumination of the targets of the wheel alignment system. The LED array may provide visible light or invisible radiant energy, e.g. in the infrared or ultraviolet portions of the spectrum.

Although not separately shown, the module may include optical isolation, to isolate the illumination circuitry 161 from the other circuits in the module. Such isolation, for example, prevents power from the strobe circuit feeding back into the logic circuits of IC 50 and damaging them. This allows "hot plugging" the circuits without damage. It also reduces the problems of surge currents in the strobe affecting the image accuracy and operation of the other circuits.

The present example of the imaging module (FIG. 5) incorporates active cooling of the electronic circuitry of the module, particularly of the camera IC 50. The cooling may utilize a fan 163. The on-off state of the fan and the speed of the fan may be controlled by the IC 50, via either the analog I/O interface or the digital I/O interface. The electronic cooler 165 may be a Peltier device or thermoelectric cooler (TEC) on the board supporting the IC 50, which is controlled via the digital I/O interface in the integrated circuit 50. As noted, the integrated circuit 50 includes a temperature sensor. The temperature sensor supplies the controller included in the circuit 50 with digital data regarding the temperature within the module 110 or 112, typically, closely related to the temperature(s) of the IC 50 and the sensor array 51 on the IC. In response, the controller sets the drive level for the electronic cooler 165 and/or the cooling fan 163. Temperature control is implemented via software of the controller in the integrated circuit 50.

In the exemplary implementation, the IC 50 includes at least one communications interface 65 (FIG. 1) that provides communications to and from a host computer. The IC 50 may also provide the circuitry for a communications hub 79. The module 110 or 112 (FIG. 5) includes the appropriate communication connector(s) 167 to enable the communications to/from the host and possibly one or more other modules, for use by communication elements of the IC 50. The communications interface 65 in the IC 50, the hub 79 and the associated connector(s) 167 in the module provide two-way data communications for the components of the imaging module 110 or 112 with the host computer 111 (FIG. 2) and possibly with each other. These elements conform to one or more data communication protocol standards and provide a coupling to a desired physical media, to enable data communication at desired speeds and in a manner desired for the particular installation. For example, if the system uses USB type communications, then the connectors would be USB type connectors coupled to a USB interface controller in the IC 50 serving as the communications interface 65 and to a USB type communications hub 79. Some additional circuitry may be provided on the board of the module 110 or 112 for some communications formats, e.g. to convert to/from optical signals or to/from particular frequencies used in wireless communications. Hence, the IC 50 and the module 110 or 112 can be readily adapted to support a variety of communication technologies, including (but not limited to) wired or wireless communications, USB, Ethernet, RS-232, Firewire, etc.

The communications between the controller on the IC 50 and the host computer 111, together with the control connection to the target illumination elements 161 enable the host computer system 111 to instruct the controller when to activate the LED array 143 and possibly the desired intensity of the illumination. In response to instructions from the host, the controller activates the LED array, and when necessary, adjusts the intensity of the light emitted by the array. Alternatively, or for some functions, the controller in the IC 50 may control activation and/or intensity of output of the illumination elements 161 automatically, in response to sensor inputs. For such purposes, there may be an additional sensor or the controller may sense a characteristic of the image from the data produced by the camera within the IC 50 itself.

For a wheel alignment system, it is desirable for the target elements or other visible objects of interest to appear as an intensity within a given range, in the camera image. In a system such as that shown, it is possible to adjust several parameters to modify the resultant intensity to bring the target or other object into the desired intensity range. In the example, the adjustable parameters include the illumination by the LED array, the aperture of the camera and the gain of the camera's internal processing circuitry (typically an analog gain). The illumination control typically keeps the illumination intensity fixed and varies the duration of the illumination to provide more or less light. Alternatively, or in addition, the CPU could control the light output intensity. The parameters may be adjusted in response to commands received from the host computer 111 or based on a control algorithm implemented in software executing on the controller within the IC 50. For example, if the target intensity in the camera output data appears too low, the controller in the IC 50 can change the opening of the camera aperture and/or time of opening to increase exposure, increase gain in the signal processing within the camera circuitry, or control the illumination.

As shown in FIG. 5, the module 110 or 112 further includes user feedback indicators, shown together at 169 in this drawing. The exemplary indicators 169 include the LED indicator lights 145, 147, 151, 153 and 155, discussed above relative to FIG. 4. Those skilled in the art will understand, however, that fewer or more indicators and/or perceptible indicators of other types may be provided in the module and controlled by the controller on the IC 50.

The controller in the IC 50 also controls one or more aspects effecting camera position. In the example, the controller controls upward and downward movement of the modules 110, 112. Those skilled in the art will recognize that similar control could be provided with regard to horizontal position, rotation, or angular pointing of the cameras (e.g. in one or two angular directions), so as to provide additional degrees of motion control. Some camera implementations may also offer focal control, either via on-chip elements or via optics included in the imaging module that respond to control signals sent via I/O interface(s).

To facilitate the up-down control in the example, the wheel alignment system includes a moveable beam mounting system 117, such as a rack and pinion system or a chain drive system or the like, for mounting the horizontal camera beam 114 on the vertical beam 115 (see also FIG. 3). In a system with two or more camera modules, the controller in one module controls the motor 171 that drives the positioning system 115. The motor 171 drives the beam mounting system 117 to move the beam up or down, in response to control signals from the module. The motor provides a motor speed indication to the controller in the IC 50, e.g. via the analog or digital I/O interface. In this example, the motor operates in response to a drive current signal. The IC 50 generates a direction signal (up or down) and a speed signal to an appropriate driver circuit, represented generically by an amplifier 173 in the drawing. The circuitry generates the appropriate motor drive current, which passes through a current sensor 175 to the motor 171. The current sensor 175 provides additional feedback regarding motor operation to the control in the IC 50. The mounting structure of the beams also includes limit switches 177 and 179, for providing feedback to the controller when the beam movement reaches either an upper limit or a lower limit, so that the controller can stop movement by cutting current to the motor.

The inclusion of the motion control in the functions controlled via the IC 50 allows implementation of a number of automatic control functions. For example, the control in the IC 50 may be programmed to detect targets visible to the camera, by processing the image data. Based on this data, it might detect motion of the targets mounted on the vehicle, e.g. as the vehicle is raised or lowered via a supporting lift. In response, the controller in the IC 50 could control the motor 171, and thus the movement effected by the mounting system 117, to raise and lower the image modules, so that the vehicle mounted targets are properly within the field of view of the cameras.

One or both of the modules 110 or 112 may include one or more elements 181 to allow user inputs. In the example, the user inputs 181 might include a wireless interface, for local radio frequency (RF) or infrared (IR) communications with a remote control. Alternatively or in addition, the user inputs 181 might include a set of switches (SWs) on the module housing, for direct user operation. The user inputs, for example, could provide commands for movement or motion control of module position, e.g. to cause the controller in the IC 50 to control the motor 171, and thus the movement effected by the mounting system 117, to raise and lower the image modules as desired by the user. Of course, the user inputs could facilitate user control of other functions of the system, e.g. pan/tilt of the modules or of the cameras within the modules, illumination, camera activation, etc.

Those familiar with machine vision technologies, such as image-based wheel alignment measurement systems, will be familiar with the structure operation and programming of the host computer system 111, which controls operation of the system 100 and processes data from the imaging modules 110, 112. The host system 111 may be implemented on a specifically designed processing system, but in the example, it is implemented by a general-purpose computer controlled by software programming. Any of a number of different types of computer may be used, for wheel alignment, however, the example utilizes a device within the class commonly referred to as a personal computer or "PC." Although those familiar with the machine vision art and/or the data processing art will generally be familiar with such computers and their associated software, it may be helpful to summarize the structural and functional aspects thereof as they might relate to the wheel alignment example of FIGS. 1-5.

Figure 6:
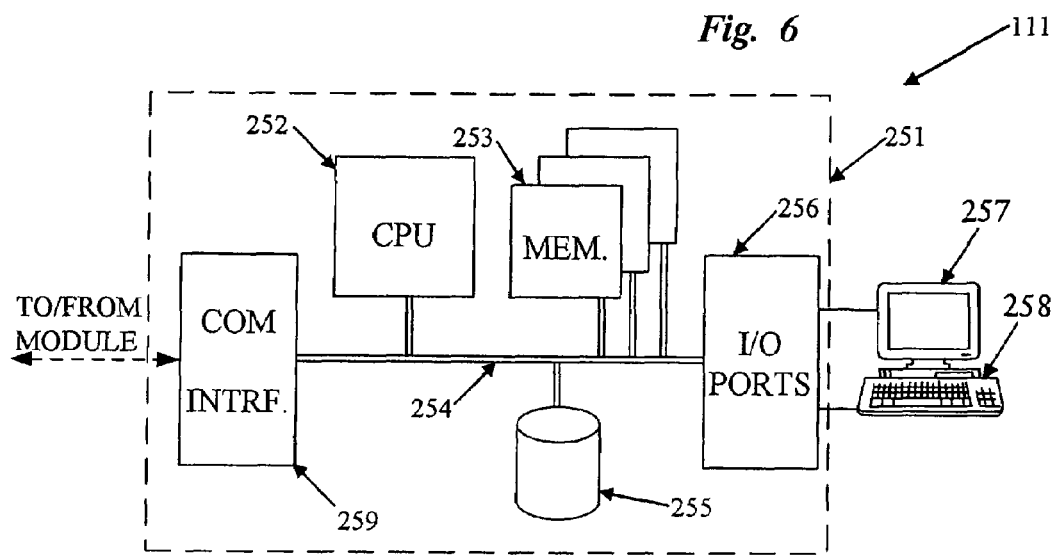
FIG. 6 is a simplified functional block diagram of a personal computer implementation of the host computer of the wheel alignment system of FIGS. 2 and 3.

FIG. 6 is a functional block diagram of a PC or workstation type implementation of a host computer system 251, which may serve as the host computer 111. In such an application, one function of the system 251 may be to process gradient image data or other forms of preprocessed image data received from the modules 110, 112 to determine wheel alignment parameters. In other implementations, the host may process alignment parameters computed in one or both of the modules for presentation to the user and/or comparison thereof to vehicle specifications. Of course, the comparison also may be performed by the processor in the IC. The system 251 may run a number of other programs that are useful to the mechanic and/or other personnel in the auto shop.

The exemplary computer system 251 contains a central processing unit (CPU) 252, memories 253 and an interconnect bus 254. The CPU 252 may contain a single microprocessor, or may contain a plurality of microprocessors for configuring the system 251 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications. For purposes of the wheel alignment application, the interface 259 provides two-way data communications with one or more of the imaging modules 110, 112. For example, the interface 259 may be a USB hub providing two or more ports for USB cable links to/from the imaging modules 110, 112. Other wired, wireless or optical links to the module(s) may be used. Although not shown, another communication interface may provide communication via a network, if desired. Such an additional interface may be a modem, an Ethernet card or any other appropriate data communications device.

The physical links to and from the communication interface(s) may be optical, wired, or wireless. For example, in a wheel aligner application, the imaging modules typically connect via USB cables. However, infrared, RF, and broadband wireless technologies may be used for these links. Any external communications may use hard wiring or wireless technologies.

The computer system 251 may further include appropriate input/output ports 256 for interconnection with a display 257 and a keyboard 258 serving as the respective user interface. For example, the computer 251 may include a graphics subsystem to drive the output display 257. The output display 257 may include a cathode ray tube (CRT) display, plasma display, liquid crystal display (LCD) or the like. Although not shown, the PC type system 111 typically would include a port for connection to a printer. The input control devices for such an implementation of the system 251 would include the keyboard 258 for inputting alphanumeric and other key information. The input control devices for the system 251 may further include a cursor control device (not shown), such as a mouse, a trackball, stylus, or cursor direction keys. The links of the peripherals 257, 258 to the system 251 may be wired connections or use wireless communications.

The computer system 251 typically runs a variety of applications programs and stores data, enabling one or more interactions via the user interface, provided through elements such as 257 and 258 to implement the desired processing. For wheel alignment applications, the programming will include appropriate code to process the data received from the particular implementation of the imaging modules. For example, if the controller in the IC 50 performs gradient computations and compression on the image data from the sensor array, the programming allows the host to decompress the gradient data and process the gradient data further, as appropriate to derive the desired wheel alignment parameters measurements. The host 111 will typically run an application or shell specifically adapted to provide the user interface for input and output of desired information for alignment and related services. As noted, because it is a general purpose system, the device 251 may run any one or more of a wide range of other desirable application programs, some of which may involve machine vision processing of image data from the modules 110, 112 but many of which may not.

The components contained in the computer systems 251 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk and loaded into RAM in the host 111 for execution. Other programming will reside in the memory on-board the IC 50. The programming also may reside on or be transported by other media for uploading into the system 251 and/or to the IC 50, to essentially install and/or upgrade the programming the appropriate system component. Hence, at different times all or portions of the executable code or data for any or all of these software elements may reside in physical media or be carried by electromagnetic media or be transported via a variety of different media to program the particular system. As used herein, terms such as computer or machine "readable medium" therefore refer to any medium that participates in providing instructions to a processor for execution. Such a medium may take many forms, including but not limited to, non-volatile media, volatile media, and transmission media as well as signals of various types that may carry data or instructions between systems or between system components.

Those skilled in the art will recognize that the concepts disclosed herein have wide applicability and may admit of a wide range of modifications. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An integrated circuit chip for use in a wheel alignment system, the integrated circuit chip comprising:
   a programmable controller;
   an image sensor controlled by the programmable controller, for imaging a field of view encompassing a target subject of a wheel alignment measurement by the system and generating representative image data; and
   a plurality of interfaces on the chip, for system elements not integrated onto the chip, the plurality of interfaces comprising:
   a data communication interface configured for communicating data, over a communication link, with a host computer of the wheel alignment system; and
   an input/output interface, for control signaling with at least one other element of the system, not integrated onto the chip, to enable the controller to control an operation of the at least one other element of the system.

2. The integrated circuit chip of claim 1, wherein the input/output interface comprises a digital input/output interface, configured for signal communication between the controller and the at least one other element of the system, not integrated onto the chip, to enable control of at least one system operation selected from the group consisting of:
   brightness control of a strobe for illumination of a target of the system;
   movement of at least one system element effecting optical input to the image sensor;
   cooling of the integrated circuit chip; and
   activation of one or more user perceptible indicators, for indicating one or more conditions regarding operations of the wheel alignment system.

3. The integrated circuit chip of claim 2, wherein the digital input/output interface also is configured for enabling the controller to receive a condition signal relating to a condition sensed by the wheel alignment system.

4. The integrated circuit chip of claim 1, wherein the input/output interface comprises an analog input/output interface, configured for signal communication between the controller and the at least one other element of the system, not integrated onto the chip, to enable control of at least one system operation selected from the group consisting of:
   brightness control of a strobe for illumination of a target of the system;
   movement of at least one system element effecting optical input to the image sensor;
   cooling of the integrated circuit chip; and
   activation of one or more user perceptible indicators, for indicating one or more conditions regarding operations of the wheel alignment system.

5. The integrated circuit chip of claim 4, wherein the analog input/output interface also is configured for enabling the controller to receive a signal representing a system condition, including at least one of sensed motor current, sensed motor speed and sensed position of an imaging module containing the integrated circuit.

6. The integrated circuit chip of claim 1, further comprising an analog to digital converter coupled to the image sensor for converting analog image signals from the image sensor into digital image data.

7. The integrated circuit chip of claim 6, wherein the controller comprises a processor programmed for pre-processing the representative digital image data, to produce the information for communication to the host.

8. The integrated circuit chip of claim 7, wherein the pre-processing of the digital image data performed by the processor comprises at least one data processing operation selected from the group consisting of: calculating gradient information from the digital image data; extracting data for a region of interest from the digital image data; performing a background subtraction on the digital image data; compressing the digital image data; recognizing an image feature from the digital image data; analyzing an image feature from the digital image data; calculating a target plane from the digital image data; calculating vehicle wheel orientation from the digital image data; calculating wheel alignment angle from the digital image data; and comparing a wheel alignment angle calculated from the digital image data to a vehicle wheel alignment specification.

9. The integrated circuit chip of claim 1, further comprising a sensor for sensing a temperature in the vicinity of the integrated circuit chip, wherein the input/output interface provides signaling from the controller to a cooling device of the system, not integrated onto the chip, to enable the controller to control the cooling device based on the sensed temperature.

10. The integrated circuit chip of claim 1, further comprising a non-volatile memory for storing at least one of calibration data for correcting non-linearity in the imaging sensor and individual pixel gain correction factors for correcting measurement accuracy.

11. The integrated circuit chip of claim 1, further comprising a unique chip identification that provides identification for a specific imaging module containing the integrated circuit chip.

12. The integrated circuit chip of claim 1, further comprising a communication hub.

13. In a wheel alignment system, the wheel alignment system having an imaging module, a host computer responsive to the imaging module for outputting a vehicle wheel alignment parameter to a user, the improvement comprising:
   an integrated circuit chip in the imaging module, the integrated circuit chip comprising:
   an image sensor, for imaging a field of view encompassing an optical target related to a wheel of a subject vehicle and generating representative image data;

a programmable controller coupled to the image sensor and programmed to pre-process the representative image data and to control at least one other operation of the wheel alignment system; and a plurality of interfaces on the chip, for system elements not integrated onto the chip, the plurality of interfaces comprising:

a data communication interface configured for communicating data, over a communication link, with the host computer; and an input/output interface, for signaling with at least one other element of the system, not integrated onto the chip, to enable the controller to receive external sensor data from or to send a control signal to the at least one other element of the system.

14. The improvement of claim 13, wherein the integrated circuit chip further comprises an analog to digital converter coupled to the image sensor, for converting analog image signals from the image sensor into digital image data.

15. The improvement of claim 13, wherein the pre-processing of the digital image data performed by the processor comprises at least one data processing operation selected from the group consisting of: calculating gradient information from the digital image data; extracting data for a region of interest from the digital image data; performing a background subtraction on the digital image data; compressing the digital image data; recognizing an image feature from the digital image data; analyzing an image feature from the digital image data; calculating a target plane from the digital image data; calculating vehicle wheel orientation from the digital image data; calculating wheel alignment angle from the digital image data; and comparing a wheel alignment angle calculated from the digital image data to a vehicle wheel alignment specification.

16. The improvement of claim 13, wherein the input/output interface comprises an analog input/output interface and a digital input/output interface.

17. The improvement of claim 13, wherein the integrated circuit chip further comprises a temperature sensor on the chip for sensing a temperature within the imaging module, and the at least one other operation of the wheel alignment system comprises cooling of the imaging module responsive to the sensed temperature.

18. The improvement of claim 13, wherein the integrated circuit chip further comprises a non-volatile memory for storing at least one of calibration data for correcting non-linearity in the imaging sensor and individual pixel gain correction factors for correcting measurement accuracy.

19. The improvement of claim 13, wherein the integrated circuit chip further comprises a unique chip identification that provides identification for a specific imaging module of the system containing the integrated circuit chip.

20. The improvement of claim 13, wherein the integrated circuit chip further comprises a communication hub.

* * * * *